United States Patent
Okazaki et al.

(10) Patent No.: US 6,189,975 B1
(45) Date of Patent: Feb. 20, 2001

(54) SEAT FRAME ASSEMBLY

(75) Inventors: Hiroyuki Okazaki, Chiryu; Naoaki Hoshihara, Aichi-ken; Yukifumi Yamada, Toyota; Satoshi Hisada, Nishio, all of (JP)

(73) Assignee: Aisin Seiki Kabushiki Kaisha, Kariya (JP)

(*) Notice: Under 35 U.S.C. 154(b), the term of this patent shall be extended for 0 days.

(21) Appl. No.: 09/261,139

(22) Filed: Mar. 3, 1999

(30) Foreign Application Priority Data

Mar. 5, 1998 (JP) .................................. 10-053750
Mar. 5, 1998 (JP) .................................. 10-053751

(51) Int. Cl.[7] .................................. A47C 7/02
(52) U.S. Cl. ................ 297/452.18; 297/344.1; 297/452.59
(58) Field of Search .............. 297/452.18, 452.2, 297/452.48, 452.59, 452.58, 344.1

(56) References Cited

U.S. PATENT DOCUMENTS

| | | | |
|---|---|---|---|
| 2,795,265 | * | 6/1957 | Albrecht ..................... 297/344.1 X |
| 3,094,358 | * | 6/1963 | Hartman ..................... 297/452.2 X |
| 4,229,040 | * | 10/1980 | Howell et al. .............. 297/232 X |
| 4,364,607 | * | 12/1982 | Tamburini .................. 297/452.59 |
| 4,756,569 | | 7/1988 | Trutter et al. . |
| 5,050,932 | * | 9/1991 | Pipon et al. ............... 297/452.18 X |
| 5,131,721 | * | 7/1992 | Okamoto ................... 297/452.18 |
| 5,412,860 | * | 5/1995 | Miyauchi et al. ........... 297/452.2 X |
| 5,601,333 | * | 2/1997 | Bostrom et al. ............ 297/452.59 X |
| 5,624,160 | * | 4/1997 | Koch et al. ................ 297/452.2 |
| 5,626,395 | * | 5/1997 | Aufrere .................... 297/452.18 |
| 5,718,478 | * | 2/1998 | Allison ..................... 297/344.1 |
| 5,913,567 | * | 6/1999 | Novak et al. ............... 297/452.18 X |
| 5,921,629 | * | 7/1999 | Koch et al. ................ 297/344.1 |

FOREIGN PATENT DOCUMENTS

| | | | |
|---|---|---|---|
| 535414 | * | 1/1957 | (CA) .................... 297/452.18 |
| 681770 | * | 9/1939 | (DE) .................... 297/344.1 |
| 914483 | * | 10/1946 | (FR) .................... 297/344.1 |
| 1196078 | * | 11/1959 | (FR) .................... 297/452.18 |
| 405049521 | * | 3/1993 | (JP) .................... 297/452.18 |
| 405085236 | * | 4/1993 | (JP) .................... 297/344.1 |
| 3-105681 | | 6/1993 | (JP) . |

OTHER PUBLICATIONS

Repair book for Collora Spacio; issued Jan. 13, 1997 from Toyota Jidosha Kabushiki Kaisha; pp. 4–25 thru 4–28.

* cited by examiner

Primary Examiner—Peter M. Cuomo
Assistant Examiner—Stephen Vu
(74) Attorney, Agent, or Firm—Burns, Doane, Swecker & Mathis, LLP

(57) ABSTRACT

A seat frame supporting a seat cushion pad formed in a predetermined shape and engaging a skin for covering the pad includes a first roll formed frame having a closed rectangular cross sectional shape and formed so as to extend along the front edge and both side edges of the pad and a second roll formed frame having a closed rectangular cross sectional shape and formed so as to extend along the rear edge of the pad. Both end portions of the first roll formed frame and both end portions of the second roll formed frame are connected to each other. Accordingly, the strength of the seat frame is improved without increasing the weight of the seat frame.

4 Claims, 6 Drawing Sheets

SEAT FRAME ASSEMBLY

BACKGROUND OF THE INVENTION

The present invention relates to a seat frame assembly for automobiles which is adapted to be mounted on a floor of the automobile.

This kind of a seat frame assembly has been known as described in Japanese Utility Model Laid-Open Publication No. Hei 5-46351. This seat frame assembly has a first pipe disposed along a front edge and a side edge of a seat cushion pad formed in a predetermined shape and a second pipe disposed along a rear edge of the pad, and is structured such that both ends of the second pipe are respectively connected to both ends of the first pipe by welding or the like.

Further, as this kind of a seat structure for a vehicle, there has been known a seat frame structure described in a repair book for Collora Spacio issued on Jan. 13, 1997 from Toyota Jidosha Kabushiki Kaisha. This seat frame structure has a rod-shaped seat cushion frame, a pair of mutually parallel lower rails extending in a longitudinal direction and a pair of upper rails slidable with respect to the lower rails. The lower rails of the conventional seat for the vehicle are arranged in lower portions of both side edges of the seat cushion frame and fixed to a vehicle floor. Further, the upper rails are slidably supported to the lower rails and are fixed to both side edges of the seat cushion frame at both ends thereof.

Further, in this conventional seat for the vehicle, the front and rear edges of the seat cushion frame are connected by separate reinforcing members fixed to a substantially center portion in a lateral direction of the seat cushion frame, thereby securing a rigidity of the seat cushion frame.

However, in the former conventional seat frame structure, since the first and second pipes are used, a cross sectional shape is restricted to a circular shape, so that it is substantially difficult to improve a strength of the seat frame structure by means other than means involving an increase in a weight such as an increase in a thickness of plate. Further, in order to mount a reclining mechanism, a slide mechanism, a skin and the like, it is necessary to secure a mounting flat surface by changing a cross sectional shape of the seat frame structure or adding a separate bracket, so that a cost increase is caused.

SUMMARY OF THE INVENTION

Accordingly, a primary object of the invention is to provide a seat frame assembly which can improve a strength without increasing a weight.

Further, in the conventional seat for a vehicle mentioned above, since the separate reinforcing member is required for reinforcing the seat cushion frame, a number of parts is increased, so that a weight increase and a cost increase are invited in the seat for a vehicle.

Accordingly, another object of the invention is to reduce the number of parts, thereby lightening a seat for a vehicle and reducing a cost of the seat for a vehicle.

In order to achieve the primary object as mentioned above, technical conception or scope employed in the present invention is a seat frame assembly comprising a first roll formed frame having a closed rectangular cross sectional shape and wholly formed so as to extend along a front edge and both side edges of a seat cushion pad and a second roll formed frame having a closed rectangular cross sectional shape and wholly formed so as to extend along a rear edge of the pad, in which both end portions of the first roll formed frame and both end portions of the second roll formed frame are respectively connected to each other.

In accordance with this technical conception or scope, since the seat frame is constituted by the first roll formed frame and the second roll formed frame, it is possible to set a desired cross sectional shape in a comparatively free manner. Accordingly, it is possible to wholly improve a strength of the seat frame assembly or partly improve a strength of a necessary portion of the seat frame assembly owing to the cross sectional shape, so that it is possible to improve a strength of the seat frame assembly without being involved with an increase of weight.

In order to achieve another object as mentioned above, technical conception employed in the present invention is a seat for a vehicle comprising a seat cushion frame wholly formed in a frame shape, a pair of mutually parallel lower rails arranged in a substantially center portion in a lateral direction of the seat cushion frame, fixed to a vehicle floor and extending in a longitudinal direction, and a pair of mutually parallel upper rails arranged in a substantially center portion in a lateral direction of the seat cushion frame, slidably supported to the lower rails, having both ends respectively fixed to substantially center portions of front and rear edges of the seat cushion frame and extending in a longitudinal direction.

In accordance with this technical conception, since the both ends of the upper rails in the slide mechanism for supporting the seat for a vehicle to the vehicle floor in such a manner as to freely adjust in a longitudinal direction are connected to the front and rear edges of the seat cushion frame at the center portions thereof, the substantially center portions of the front and rear edges in the seat cushion frame can be connected by the upper rails. Accordingly, the upper rails can function as a reinforcing member for the seat cushion frame, so that the separate reinforcing member which is necessary in the conventional seat for a vehicle is not required. As a result, it is possible to lighten a seat for a vehicle and reduce a cost thereof.

In accordance with the present invention, since the seat frame assembly is constituted by the first roll formed frame and the second roll formed frame each having a rectangular cross section, it is possible to set a desired cross sectional shape in a comparatively free manner, so that it is possible to wholly improve a strength of the seat frame or partly improve a strength of a necessary portion of the seat frame owing to the cross sectional shape. Accordingly, it is possible to improve a strength of the seat frame without being involved with an increase of weight.

Further, in accordance with the present invention, since the first roll formed frame and the second roll formed frame are fixed to the arm member in the reclining mechanism so as to constitute a functional part of the seat frame by setting the arm member as the connection part, a number of parts can be reduced, and a weight reduction and a cost reduction can be achieved.

Still further, in accordance with the present invention, since the first roll formed frame and the second roll formed frame are fixed by setting the slide mechanism as the rail member so as to constitute a functional part of the seat frame assembly by setting the arm member as the reinforcing part, a number of parts can be reduced, and a weight reduction and a cost reduction can be achieved.

In accordance with the present invention, since the upper rail of the slide mechanism is fixed to the substantially center portion in the lateral direction of the front and rear edges of the seat cushion frame at the both ends thereof so as to connect the front and rear edges of the seat cushion frame, it is possible to cause the upper rail to function as the

DESCRIPTION OF THE PREFERRED EMBODIMENT

Figure 1:
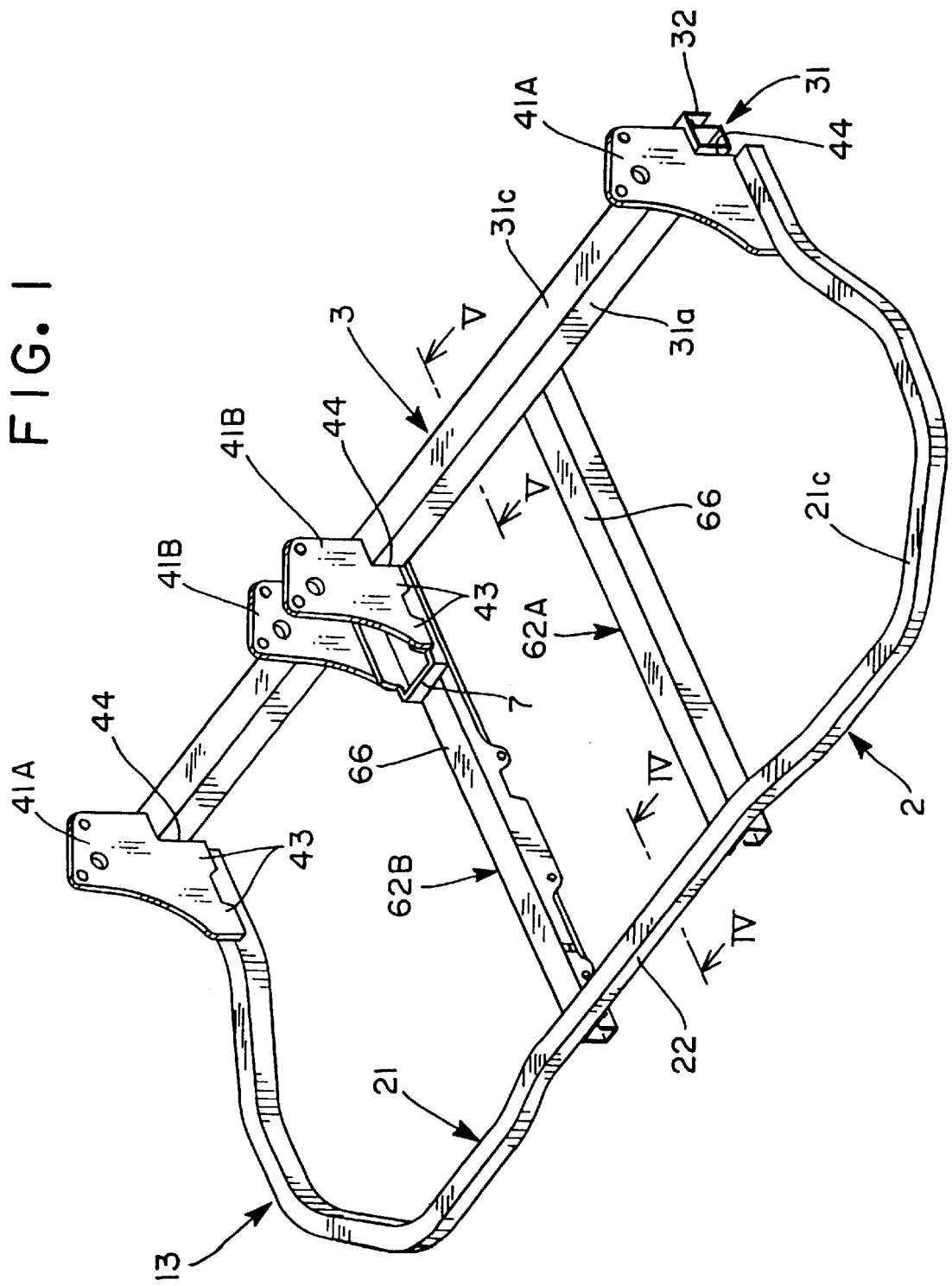
FIG. 1 is a perspective view of a seat frame assembly in accordance with the invention.
Figure 2:
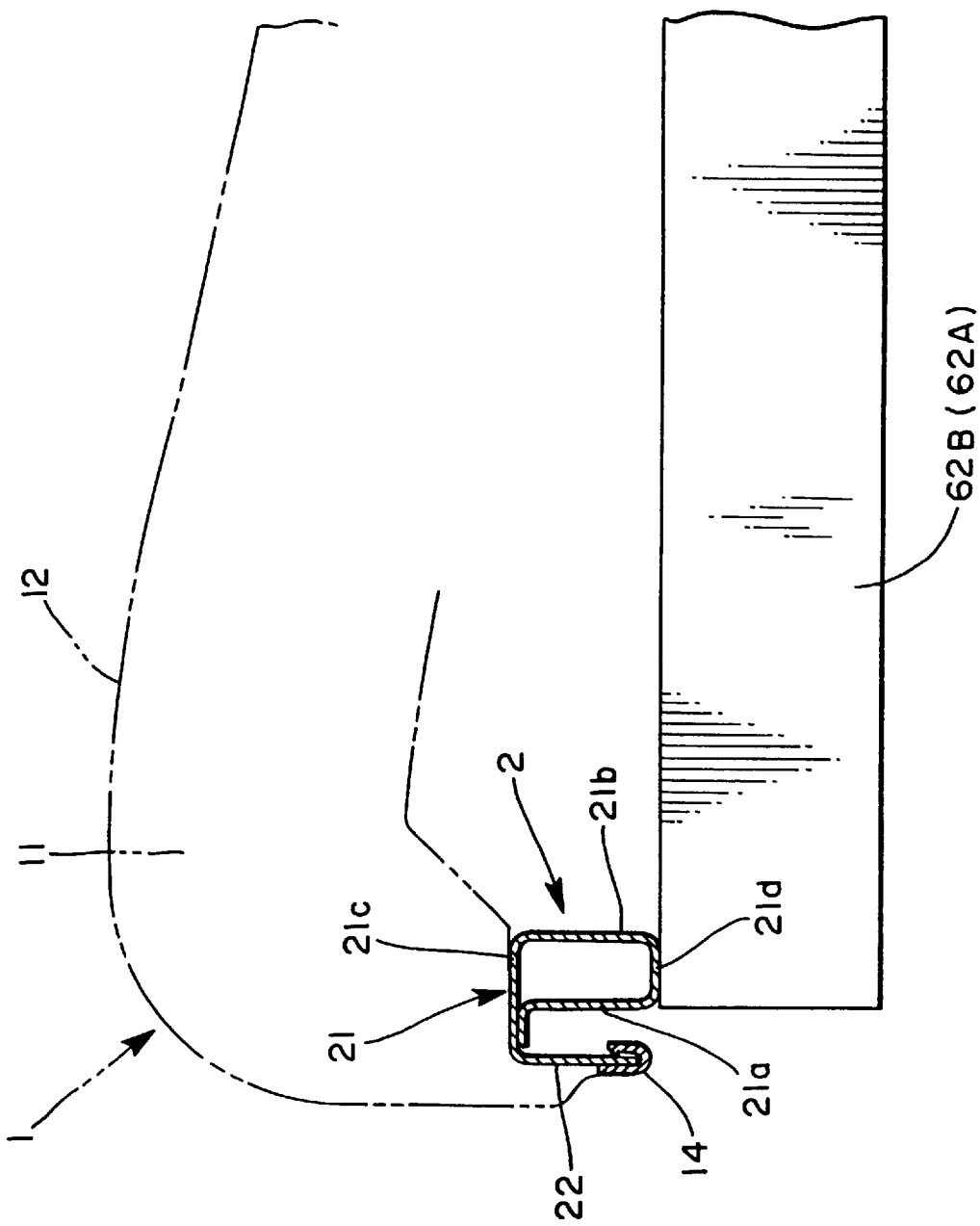
FIG. 2 is a cross sectional view of a front portion of a seat cushion assembly in a seat for a vehicle which employs a seat frame in accordance with the invention.
Figure 3:
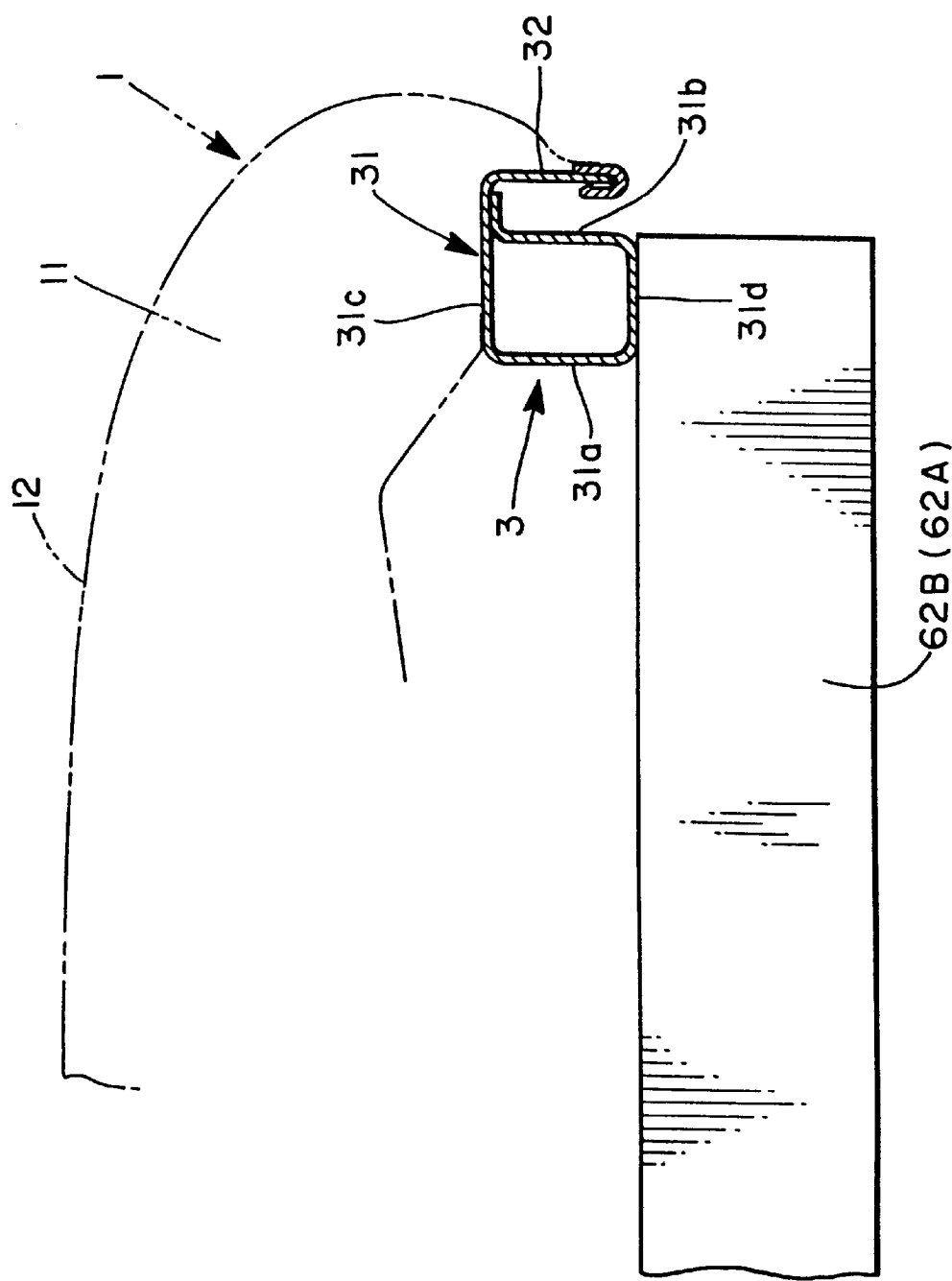
FIG. 3 is a cross sectional view of a rear portion of a seat cushion in a seat for a vehicle which employs a seat frame assembly in accordance with the invention.

As shown in FIGS. 1 to 3, a predetermined-shape seat cushion pad 11 forming a seat cushion 1 of a seat for a vehicle is mounted and a skin corresponding to an external appearance of the seat cushion 1 is engaged so as to cover the pad 11, whereby a frame 13 corresponding to a framework of the seat cushion 1 is mainly constituted by a first roll formed frame 2 and a second roll formed frame 3.

Figure 4:
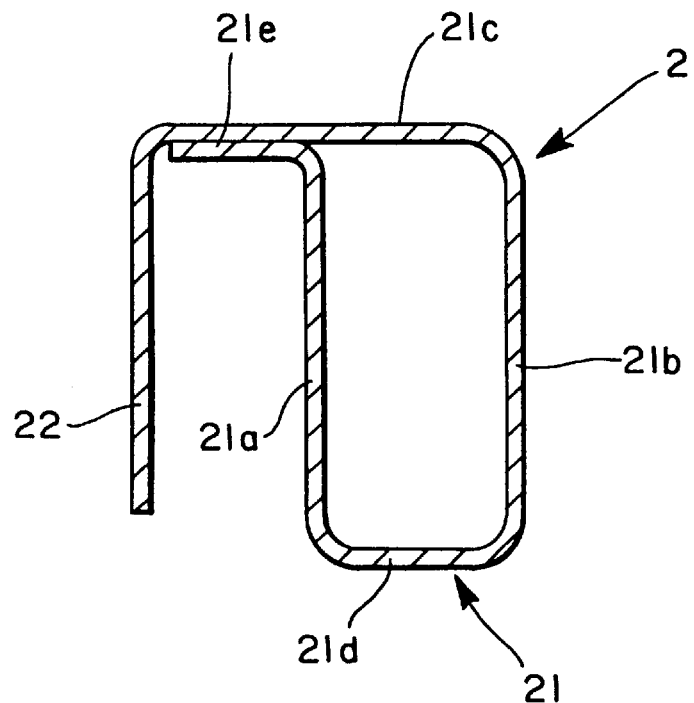
FIG. 4 is a cross sectional view along a line IV—IV in FIG. 1.

The first roll formed frame 2 is formed in a substantially U shape substantially extending along a front edge and both side edges of the pad 11 as a whole, and has a closed rectangular cross sectional shape. The first roll formed frame 2 is formed by bending a sheet of plate material made of a high strength steel or an aluminum based alloy by a roll forming in such a manner as to form a predetermined cross sectional shape, as shown in FIG. 4, and is provided with a rectangular portion 21 comprising front and rear walls 21a and 21b and upper and lower walls 21c and 21d for integrally connecting the front and rear walls 21a and 21b, and a flange portion 22 integrally and continuously extending from the upper wall 21c of the rectangular portion 21 substantially in parallel to the front wall 21a with a predetermined interval.

In this case, a closed cross section of the rectangular portion 21 is constituted by bending an upper end of the front wall 21a in a flange manner so as to form an adhesion portion 21e and welding the adhesion portion 21e at a portion continuing the flange portion 22 of the upper wall 21c. Further, as shown in FIGS. 1 and 2, the rectangular portion 21 secures a rigidity of the first roll formed frame 2 by its own closed cross sectional shape, and the pad 11 is placed on the upper wall 21c of the rectangular portion 21. Still further, the flange wall 22 locks a skin 12 by a clip 14.

Figure 5:
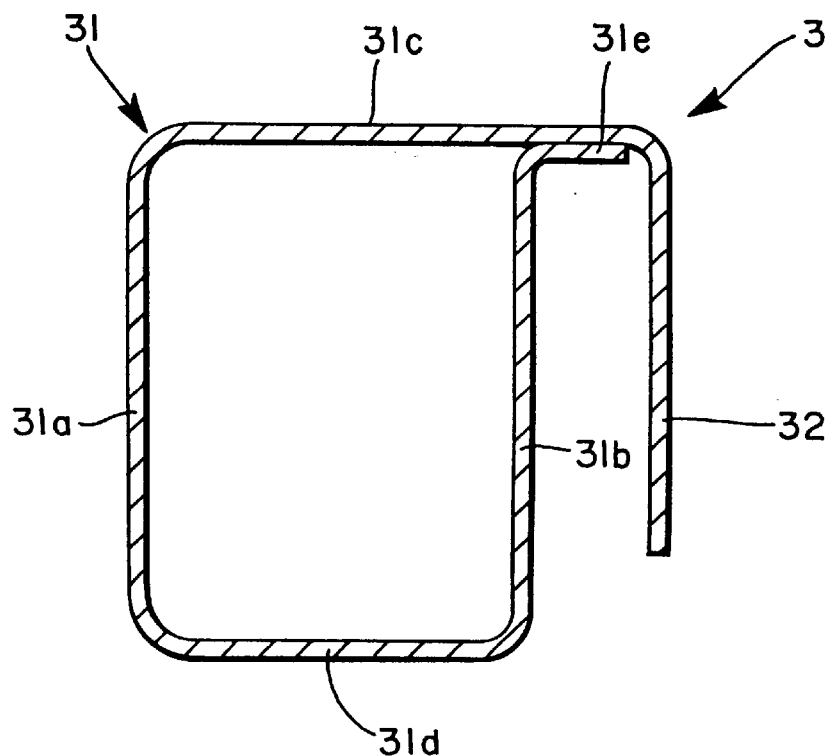
FIG. 5 is a cross sectional view along a line V—V in FIG. 1.

The second roll formed frame 3 is formed in a substantially straight shape substantially extending along a rear edge of the pad 11 as a whole, and has a closed rectangular cross sectional shape similarly to the first roll formed frame 2. The second roll formed frame 3 is formed, as shown in FIG. 5, by means of bending a sheet of plate material by a roll forming process so as to form a predetermined cross sectional shape similarly to the first roll formed frame 2, and is provided with a rectangular portion 31 comprising front and rear walls 31a and 31b and upper and lower walls 31c and 31d for integrally connecting the front and rear walls 31a and 31b, and a flange portion 32 integrally and continuously extending from the upper wall 31c substantially in parallel to the rear wall 31b with a predetermined interval.

In this case, a closed cross section of the rectangular portion 31 is constituted by bending an upper end of the rear wall 31b in a flange manner so as to form an adhesion portion 31e and welding the adhesion portion 31e at a portion continuing to the flange portion 32 of the upper wall 31c. Further, as shown in FIGS. 1 and 3, the rectangular portion 31 secures a rigidity of the second roll formed frame 3 by its own closed cross sectional shape, and the pad 11 is placed on the upper wall 31c of the rectangular portion 31. Still further, the flange wall 32 locks the skin 12 by the clip 14.

Figure 6:
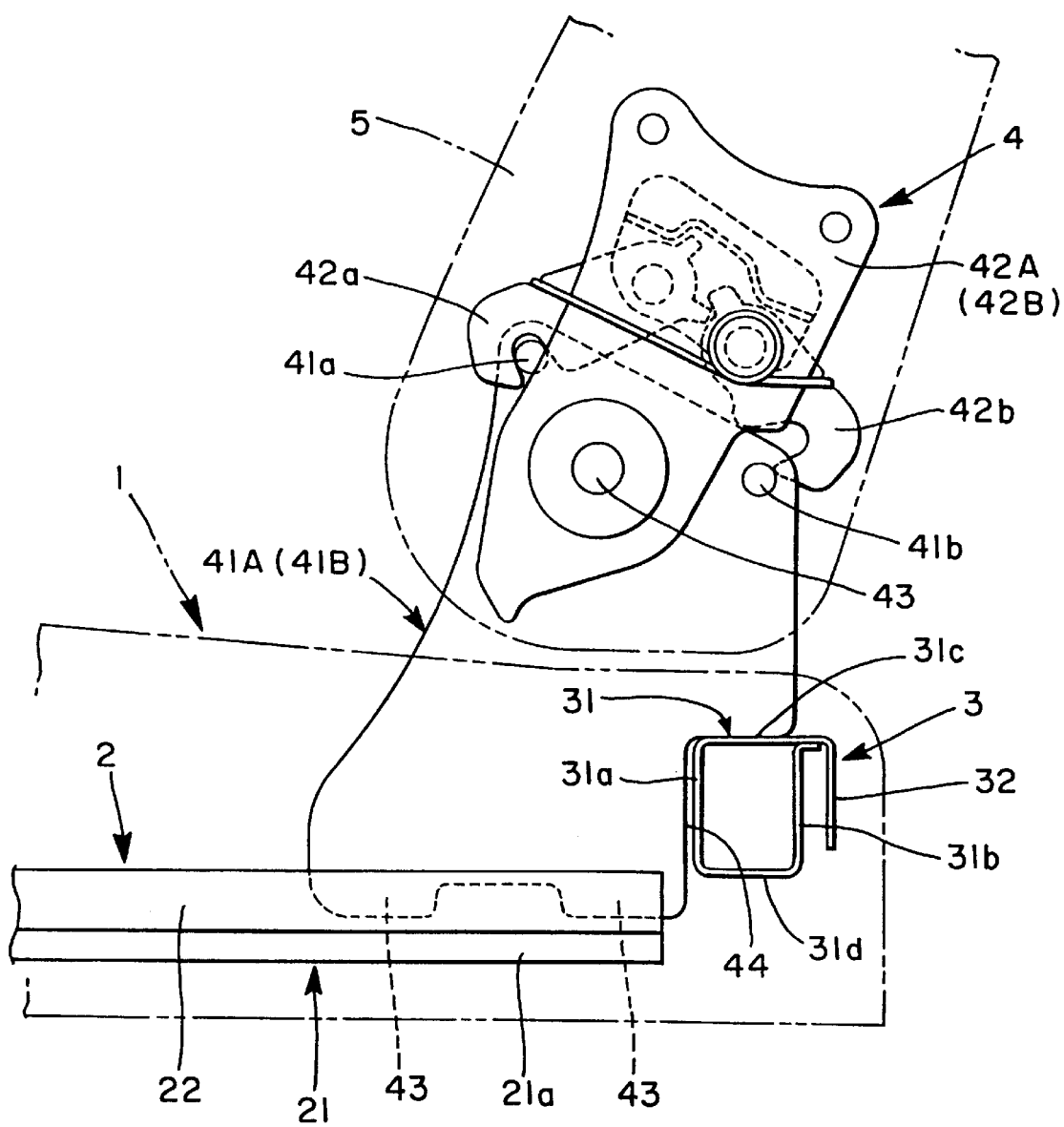
FIG. 6 is a front elevational view of a reclining mechanism in accordance with the invention.

As shown in FIG. 6, a reclining mechanism 4 operating in an interlocking manner is structured so as to support a seat back 5 of the seat for the vehicle to the rear portion of the seat cushion 1 in such a manner as to freely adjust an angle of incline of the seat back 5 with respect to the seat cushion 1, and is mainly constituted by a pair of left and right lower arms 41A and 41B mounted to a side of the seat cushion 1, and a pair of left and right upper arms 42A and 42B mounted to a side of the seat back. The upper arms 42A and 42B are rotatably supported to the lower arms 41A and 41B by a pin 43.

First and second engagement pins 41a and 41b stood from the lower arms 41A and 41B and first and second poles 42a and 42b rotatably supported to the upper arms 42A and 42B are alternately engaged with each other, respectively, so that a rotational motion of the upper arms 41A and 41B with respect to the lower arms 41A and 41B is restricted so as to hold the seat back 5 with respect to the seat cushion 1 at a desired angle of incline. In this case, a pair of left and right upper arms 42A and 42B rotate with respect to the lower arms 41A and 41B in an interlocking manner.

A flange portion 43 corresponding to a mounting portion to the seat cushion 1 and a notch portion 44 are formed in the lower arm 41 of the reclining mechanism 4, as mentioned later.

Incidentally, in this embodiment, since the seat back is structured such as to be separated into two left and right portions, a pair of left and right reclining mechanisms 4 are provided in correspondence thereto.

Figure 7:
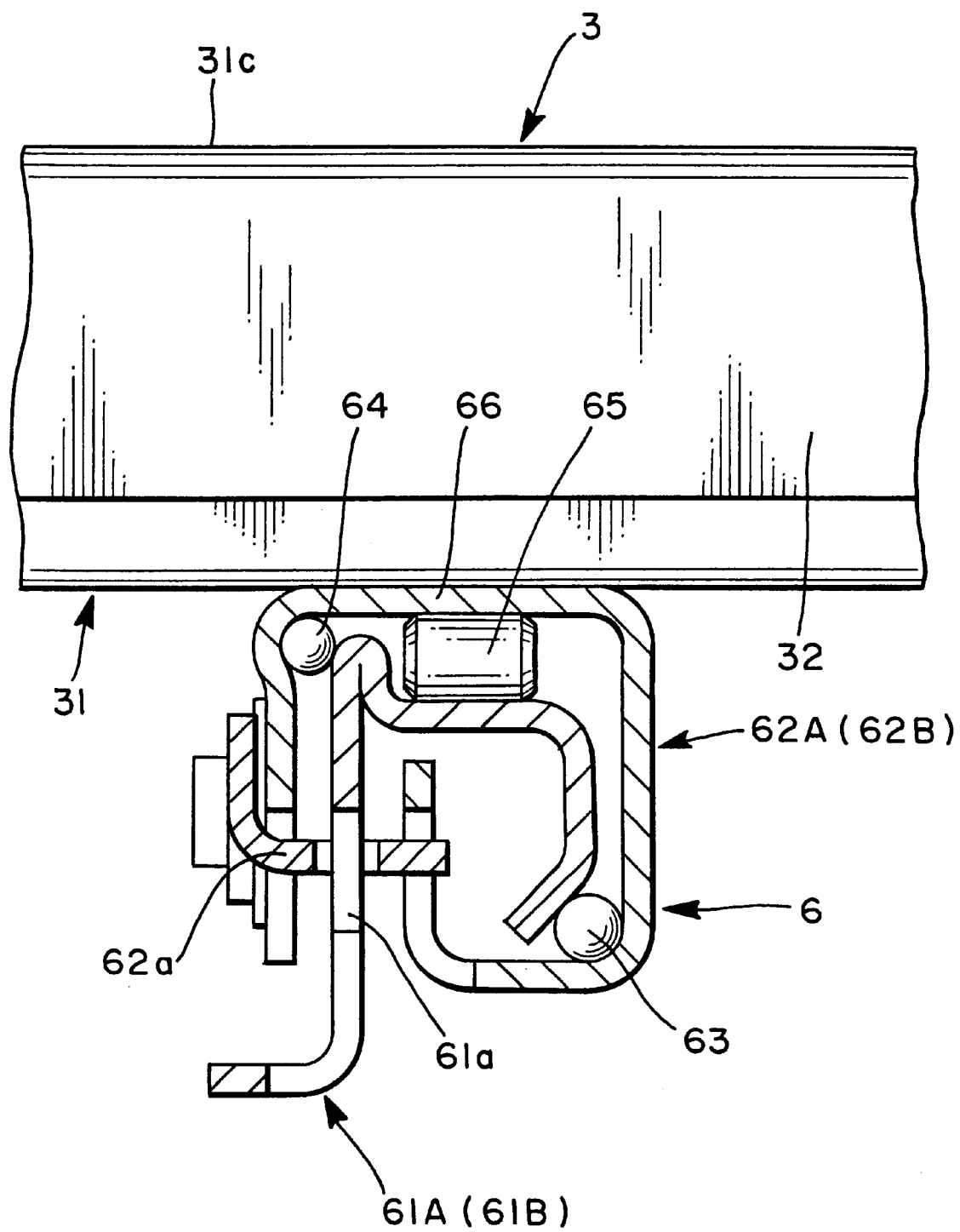
FIG. 7 is a cross sectional view of a slide mechanism in accordance with the invention.

As shown in FIG. 7, a slide mechanism 6 is structured so as to support the seat for the vehicle to the vehicle floor in such a manner as to adjust front and rear positions, and is mainly constituted by a pair of left and right lower rails 61A and 61B mounted to a side of the vehicle floor, and a pair of left and right upper rails 62A and 62B mounted to a side of the seat for a vehicle. The upper rails 62A and 62B are slidably supported to the lower rail 61 via a pair of balls 63 and 64 and a roller 65.

An engagement tooth 61a formed in the lower rail 61A, 61B and a lock plate 62a rotatably supported to the upper rail 62A, 62B are engaged with each other, so that a sliding motion of the upper rails 62A and 62B with respect to the lower rails 61A and 61B is restricted so as to hold the seat for the vehicle with respect to the vehicle floor at desired forward and rearward positions. In this case, a pair of left and right upper rails 62A and 62B slide with respect to the lower rails 61A and 61B in an interlocking manner.

A flat upper wall 66 which may be used as a mounting portion to a side of the seat cushion 1 is formed in the upper rail 62A (62B) of the slide mechanism 6, as mentioned later.

As shown in FIGS. 1 and 6, the lower arm 41A of the reclining mechanism 4 is arranged between both ends of the first roll formed frame 2 and both ends of the second roll formed frame 3. The lower arm 41A is fixed to the rear wall 21b of the rectangular portion 21 in the first roll formed frame 2 at the flange portion 43 in an overlapping manner by a bolt or the like, and is fitted to the rectangular portion 31 in the second roll formed frame 3 at the notch portion 44 and adhered to the front wall 31a and the upper wall 31c by welding or the like. Accordingly, the first roll formed frame 2 and the second roll formed frame 3 are connected to each other at both ends thereof by the lower arm 41A, so that the lower arm 41A functions as a component of the frame 3 to reinforce the frame 3.

As shown in FIGS. 1 and 7, the upper rails 62A and 62B of the slide mechanism 6 is fixed to the center portion of the first roll formed frame 2 at the front end thereof by means of welding or the like, and is fixed to the center portion of the second roll formed frame 3 at the rear end thereof by means of welding or the like.

Accordingly, the upper rails 62A and 62B function as a component of the frame 3 so as to reinforce the frame 3.

As shown in FIG. 1, the lower arm 41B of the reclining mechanism 4 is fixed to an upper wall 66 in the side of the rear end of the upper rail 62B in the slide mechanism 6 by a bracket 7 by means of welding or the like.

In this manner, since the lower arm 41A of the reclining mechanism 4 itself corresponds to the component of the frame 3 and the lower arm 41B is fixed to the upper rail 62B constituting the component of the frame 3, it is possible to withstand a high load, and it is possible to cause the lower arms 41A and 41B to function as a mounting plate for a load input member such as a seat belt buckle.

The bracket 7 is formed in a box-like shape and its bottom wall is welded to the upper wall 66 of the upper rail 62B. The lower arms 41A, 41B are welded to opposed side walls of the bracket 7, respectively.

As many apparently widely different embodiments of the present invention can be made without departing from the spirit and scope thereof, it is to be understood that the invention is not limited to the specific embodiments thereof except as defined in the appended claims.

What is claimed is:

1. A seat frame assembly for an automobile seat comprising:
   a first frame formed by bending a sheet of material in a roll-process and welding one edge portion of the material to another portion of the material, the first frame having a closed rectangular cross sectional shape and adapted to extend along a front edge and both side edges of a seat cushion pad to be mounted thereon; and
   a second frame formed by bending a sheet of material in a roll-process and welding one edge portion of the material to another portion of the material, the second frame having a closed rectangular cross sectional shape and adapted to extend along a rear edge of said pad,
   wherein said second frame is positioned flush with said first frame, with both end portions of said first frame and both end portions of said second frame being connected to each other by a welded connection.

2. A seat frame assembly according to claim 1, further comprising a pair of left and right arm members of a reclining mechanism arranged between both end portions of said first frame and both end portions of said second frame, wherein both end portions of said first frame and both end portions of said second frame are respectively connected to each other via said arm members.

3. A seat frame assembly according to claim 1, wherein a center portion of said first frame in a direction of a width of the seat and a center portion of said second frame in a direction of a width of the seat are connected to each other by a pair of left and right rail members of a seat slide mechanism.

4. A seat frame assembly according to claim 1, wherein said first frame and said second frame are integrally provided with front and rear walls and upper and lower walls for connecting said front and rear walls, and a flange portion integrally extending from said upper wall of said closed rectangular cross sectional portion and engaging with a skin for said pad.

* * * * *